(12) United States Patent
Hashimoto

(10) Patent No.: US 9,671,901 B2
(45) Date of Patent: Jun. 6, 2017

(54) ELECTRODE SHEET FOR CAPACITANCE-TYPE TOUCH PANEL

(71) Applicant: NISSHA PRINTING CO., LTD., Kyoto (JP)

(72) Inventor: Takao Hashimoto, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 14/901,308

(22) PCT Filed: Sep. 25, 2014

(86) PCT No.: PCT/JP2014/075427
§ 371 (c)(1),
(2) Date: Dec. 28, 2015

(87) PCT Pub. No.: WO2015/050029
PCT Pub. Date: Apr. 9, 2015

(65) Prior Publication Data
US 2016/0370916 A1 Dec. 22, 2016

(30) Foreign Application Priority Data
Oct. 1, 2013 (JP) .................................. 2013-206106

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04103* (2013.01); *G06F 2203/04111* (2013.01); *G06F 2203/04112* (2013.01)

(58) Field of Classification Search
CPC ................... G06F 3/044; G06F 3/0416; G06F 2203/04111; G06F 2203/04112; G06F 2203/04113
See application file for complete search history.

(56) References Cited

U.S. PATENT DOCUMENTS

2010/0026664 A1 2/2010 Geaghan
2010/0028811 A1 2/2010 Geaghan
(Continued)

FOREIGN PATENT DOCUMENTS

JP 2006-344163 12/2006
JP 2011-175628 9/2011
(Continued)

OTHER PUBLICATIONS

International Search Report issued Dec. 2, 2014 in International (PCT) Application No. PCT/JP2014/075427.

*Primary Examiner* — Kevin M Nguyen
(74) *Attorney, Agent, or Firm* — Wenderoth, Lind & Ponack, L.L.P.

(57) ABSTRACT

A first electrode pattern 25a and a second electrode pattern 25b, each composed of an opaque conductive fine line and a blank part 17 partitioned by the conductive fine line, have line segments 16a of the conductive fine lines 16, that face each other across a substrate 12, and the conductive fine line 16 in one of the first electrode pattern 25a and the second electrode pattern 25b is formed narrower in line width than that in the other of the first electrode pattern 25a and the second electrode pattern 25b only at the facing line segment 16a, thereby designed to have a non-uniform width.

11 Claims, 10 Drawing Sheets

(56) References Cited

U.S. PATENT DOCUMENTS

| | | | |
|---|---|---|---|
| 2012/0206395 A1 | 8/2012 | Misaki | |
| 2012/0312677 A1 | 12/2012 | Kuriki | |
| 2012/0313893 A1 | 12/2012 | Geaghan | |
| 2013/0222325 A1* | 8/2013 | Cok | G06F 3/044 345/174 |
| 2014/0054070 A1* | 2/2014 | Ichiki | G06F 3/044 174/253 |
| 2014/0139761 A1 | 5/2014 | Yanagawa et al. | |
| 2014/0144766 A1* | 5/2014 | Feng | H01H 1/027 200/600 |
| 2015/0068884 A1 | 3/2015 | Kuriki | |

FOREIGN PATENT DOCUMENTS

| | | |
|---|---|---|
| JP | 2011-530112 | 12/2011 |
| JP | 2012-079238 | 4/2012 |
| JP | 2012-198879 | 10/2012 |
| WO | 2011/052392 | 5/2011 |
| WO | 2012/121064 | 9/2012 |
| WO | 2013/014883 | 1/2013 |

* cited by examiner

ELECTRODE SHEET FOR CAPACITANCE-TYPE TOUCH PANEL

TECHNICAL FIELD

The present invention relates to an electrode sheet for a capacitance-type touch panel in which an electrode is composed of a pattern of an opaque conductive fine line such as a metal fine line.

BACKGROUND ART

In general, a capacitance-type touch panel is a position input device which senses a change in capacitance between a human fingertip and a conductive layer to detect a position of the fingertip, and as capacitance-type touch panel, there exists a surface type and a projection type. The surface type one has a simple constitution; however, it is difficult to detect two or more contacts simultaneously (multi-touch). Meanwhile, the projection type one is composed of multiple electrodes arranged in a matrix, and more specifically, it has a constitution that a plurality of first electrodes are arranged in a horizontal direction and a plurality of second electrodes are arranged in its perpendicular direction via an insulating layer, and is able to detect a multi-touch by sequentially sensing a capacitance change in the first electrode group and the second electrode group.

Though a touch panel like this is mainly applied to a small size one for a smartphone or a tablet device, it is considered in future to proceed enlargement in size for an application to a display for a personal computer or the like. In this future trends, since a conventional electrode is made of ITO (indium tin oxide), its resistance is high (about hundreds ohms/sq.), and so there is a problem that transfer rate of current between electrodes reduces and response speed (time from contact with a fingertip until detecting its position) is delayed as its applicable size increases. In addition, since ITO is expensive, it has been a problem of difficulty of the enlargement.

Therefore, in order to solve these problems, a technology for constituting an electrode of a metal fine line (that is so called a metal mesh electrode), that is formed by microfabricating a metal thin film of inexpensive and low resistance gold, silver, copper or the like and has a line width invisible to a touch user, has been developed. Touch panels using a metal fine line for the electrode are known in the Patent Literatures 1 to 3, for example.

CITATION LIST

Patent Literature

Patent Literature 1
  Japanese Unexamined Laid-open Patent Application Publication No. 2011-530112
Patent Literature 2
  Japanese Unexamined Laid-open Patent Application Publication No. 2012-079238
Patent Literature 3
  Japanese Unexamined Laid-open Patent Application Publication No. 2011-175628

SUMMARY OF INVENTION

Technical Problem

In the case of using a metal fine line in the electrode, transparency and visibility becomes a problem since the metal fine line is made of an opaque material.

For example, a projection capacitance-type touch panel has a constitution that a plurality of first electrodes are arranged in a horizontal direction and a plurality of second electrodes are arranged in its perpendicular direction via an insulating layer, as described above. For manufacturing an electrode sheet for a touch panel of such constitution, it is considered that a single film or a laminated film in which two or more layers are sticked each other is used as a substrate, a metal layer having light shielding property is formed on both surfaces of the substrate, then a photosensitive resist is formed on the both surfaces, the both surfaces are exposed simultaneously, using photomasks of different images for the first electrode group and the second electrode group, and developed, etched and the resist is stripped. In this method, positions of the photomasks placed on both surfaces of the substrate need to be adjusted accurately in exposing the photosensitive resist; however, it is difficult to eliminate positional deviation completely.

Even in the case where the electrode is designed to be composed of a metal fine line having a line width invisible to a touch user, when the positional deviation occurs at a part where a fine line in the first electrode and a fine line in the second electrode face each other across the substrate, a problem arises that the line width in the pattern is made partly thickened in a plan view (hereinafter, referred to as line thickening) to be recognized by a touch user. Further, an area of a transparent region is reduced for the line thickened, that causes a problem of lowering light transmittance from the display device.

Therefore, the present invention has been made in consideration of these problems, and an object of the present invention is to provide an electrode sheet for a capacitance-type touch panel in which a conductive fine line is hardly visible and high transparency can be ensured, even in the case where an electrode is composed of a pattern of an opaque conductive fine line such as a metal fine line.

Solution to Problem

To achieve the above object, the present invention is configured as follows.

The present invention provides an electrode sheet for a capacitance-type touch panel comprising a transparent substrate, a first conductive part provided on one principal surface of the substrate, and a second conductive part provided on the other principal surface of the substrate; wherein the first conductive part has a plurality of first electrode patterns, that are composed of conductive fine lines, each being opaque, and blank parts partitioned by the conductive fine line, extend in a first direction, and arranged in a second direction perpendicular to the first direction; the second conductive part has a plurality of second electrode patterns, that are composed of conductive fine lines, each being opaque, and blank parts partitioned by the conductive fine line, extend in the second direction, and arranged in the first direction; the first electrode pattern and the second electrode pattern have line segments of the conductive fine lines, that face each other across the substrate; and the conductive fine line in one of the first electrode pattern and the second electrode pattern is formed narrower in line width than that in the other of the first electrode pattern and the second electrode pattern only at the facing line segment, thereby formed to have a non-uniform width.

It is preferred that a narrowed ratio in the facing line segment is in the range of 30% to 90%.

It is preferred that combination of the first conductive part and the second conductive part gives a projected mesh pattern at a part where optical transparency is required.

It is preferred that line width of the projected mesh pattern is 15 μm or less and aperture rate is 85% or more.

It is preferred that at least one of the first electrode pattern and the second electrode pattern is formed in a shape having a mesh structure.

Neither of the first electrode pattern nor the second electrode pattern may be formed in a shape having a mesh structure.

It is preferred that one of the first electrode pattern and the second electrode pattern, of which the line width at the facing line segment is formed narrower, is made shorter than the other of the first electrode pattern and the second electrode pattern.

The conductive fine line may be a metal fine line made of a metal selected from the group consisting of gold, copper, silver, nickel, aluminum and molybdenum or an alloy.

It is preferred that a touch side surface of the conductive fine line is made a low-reflection treatment.

The conductive fine line may be a non-metal fine line containing one or more material selected from the group consisting of carbon, carbon nanotube and graphene.

It is preferred that the first conductive part further has a plurality of first dummy patterns, that are composed of a conductive fine line made of a same material as the first electrode pattern, placed at a gap between the adjacent first electrode patterns, and insulated electrically from the first electrode pattern; the second conductive part further has a plurality of second dummy patterns, that are composed of a conductive fine line made of a same material as the second electrode pattern, placed at a gap between the adjacent second electrode patterns, and insulated electrically from the second electrode pattern; and one of the first electrode pattern and the second electrode pattern, of which the line width at the facing line segment is formed narrower, is formed narrower also at a line segment which faces the first dummy pattern or the second dummy pattern.

Advantageous Effects of Invention

As explained above, according to the electrode sheet for a capacitance-type touch panel of the present invention, the conductive fine line is hardly visible and high transparency can be ensured, even in the case where the electrode is composed of a pattern of an opaque conductive fine line such as a metal fine line.

DESCRIPTION OF THE PREFERRED EMBODIMENTS

An electrode sheet for a capacitance-type touch panel of the present invention is hereinafter explained in detail, referring to drawings.

First Embodiment (Constitution of an Electrode Sheet)

Figure 1:
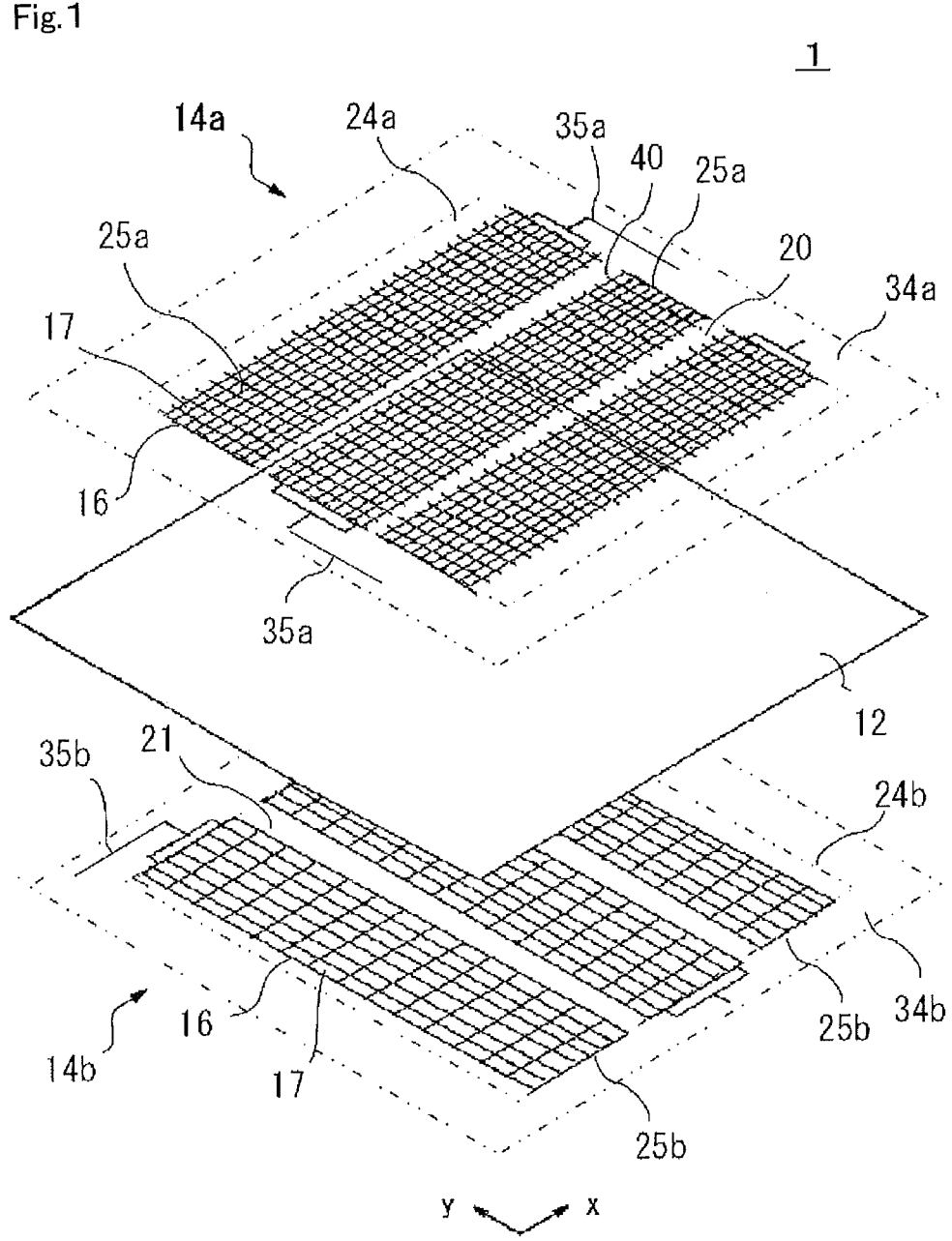
FIG. 1 shows an exploded perspective view, which is omitted partially, of an example of an electrode sheet for a capacitance-type touch panel of the present invention.
Figure 2:
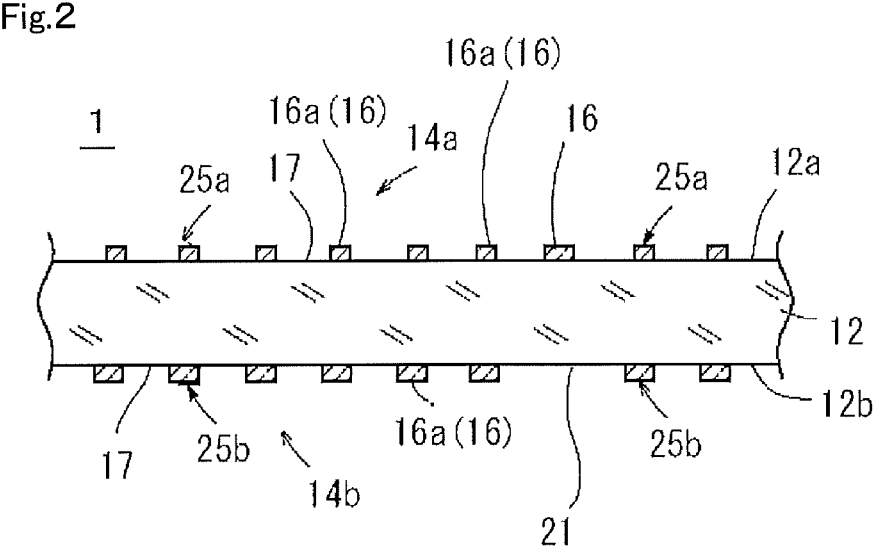
FIG. 2 shows a cross-sectional view, which is omitted partially, of an example of an electrode sheet for a capacitance-type touch panel of the present invention.

An electrode sheet for a capacitance-type touch panel of a first embodiment comprises a transparent substrate 12, a first conductive part 14a provided on one principal surface of the substrate 12, and a second conductive part 14b provided on the other principal surface of the substrate 12, as shown in FIG. 1. FIG. 2 shows a cross-sectional view of one of a first electrode pattern 25a in the electrode sheet shown in FIG. 1 across a longitudinal direction thereof.

The substrate 12 is made of a material having an insulating property and high translucency, such as resins, glasses and silicone. Examples of the resin include polyesters such as polyethylene terephthalate (PET), polylactic acid (PLA) and polyethylene naphthalate (PEN), polyolefins such as polyethylene (PE), polypropylene (PP), polystyrene, EVA, cycloolefin polymer (COP) and cyclic olefin copolymer (COC), and others such as vinyl resins, polycarbonate (PC), polyamides, polyimides, acrylic resins (PMMA) and triacetyl cellulose (TAC). Further, both surfaces of a film made of such resin may be coated with a resin.

Thickness of the substrate 12 is preferably in the range of 5 μm to 350 μm and more preferably in the range of 30 μm to 150 μm. When it is in the range of 5 μm to 350 μm, desired visible light transmittance can be obtained and its handling is made easy. In addition, the substrate 12 may be a single layer or a laminate in which two or more layers are sticked each other. Further, the substrate 12 may have a ¼λ retardation film in its structure. As the substrate 12, a piezoelectric film causing no pyroelectricity, that is prepared by uniaxially-stretching a polylactic acid film of the above described, can be used.

Each of the first conductive part 14a and the second conductive part 14b includes a part where optical transparency is required (that is a first sensor part 24a and a second sensor part 24b) and a part where optical transparency is not required (that is a first terminal wiring part 34a and a second terminal wiring part 34b). An outer shape of the electrode sheet 1 is a rectangular shape in a plan view as well as each outer shape of the first sensor part 24a and the second sensor part 24b is a rectangular shape.

The first sensor part 24a of the first conductive part 14a has a plurality of first electrode patterns 25a, that are composed of conductive fine lines 16, each being opaque, and blank parts 17 partitioned by the conductive fine line, extend in a first direction (that is X direction in FIG. 1), and arranged in a second direction (that is Y direction in FIG. 1) perpendicular to the first direction.

The second sensor part 24b of the second conductive part 14b has a plurality of second electrode patterns 25b, that are composed of conductive fine lines 16, each being opaque, and blank parts 17 partitioned by the conductive fine line, extend in the second direction (that is Y direction in FIG. 1), and arranged in the first direction (that is X direction in FIG. 1). Since the substrate 12 is made of an insulating material as described above, the second conductive part 14b is under a state of being electrically insulated from the first conductive part 14a (see FIG. 2).

As the conductive fine lines 16 which constitute the first electrode pattern 25a and the second electrode pattern 25b, a metal fine line made of, for example, a metal selected from the group consisting of gold, copper, silver, nickel, aluminum and molybdenum or an alloy can be used.

In the present embodiment, the pattern that is composed of the opaque conductive fine lines 16 and the blank parts 17 partitioned by the conductive fine line is a pattern having a mesh structure, specifically. That is, an outline of the each mesh structure is formed of the conductive fine line 16, and an opening is formed of the blank part 17 surrounded by the conductive fine line 16 (see FIG. 1). When the first electrode pattern 25a and the second electrode pattern 25b are formed in such a pattern, transparency and low resistance are provided. Sheet resistances of the first electrode pattern 25a and the second electrode pattern 25b are preferably 50 ohm/sq. or lower, more preferably 30 ohm/sq. or lower, and most preferably 10 ohm/sq. or lower.

In the mesh structure, that is applied to the first electrode pattern 25a and the second electrode pattern 25b in the electrode sheet for a capacitance type touch panel, it is preferable that the opening is formed in a quadrangle shape, as shown in FIG. 1, or another polygonal shape. This is because if the opening having a shape other than polygonal shapes such as, for example, a circular shape or an elliptical shape is formed, a thick portion of the outline is formed between the openings, even densely-arranged maximally, thereby showing up the thick portion of the outline and causing lowering of light transmittance. In addition, it may be formed in a shape of one kind or a combination of plural kinds selected from the figures of triangle, quadrangle, hexagon and others.

Figure 3:
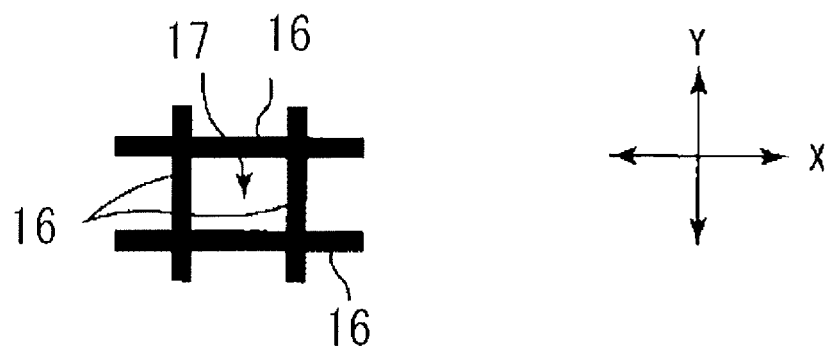
FIG. 3 is an explanatory drawing which shows an enlarged view of an example of a mesh structure.
Figure 4:
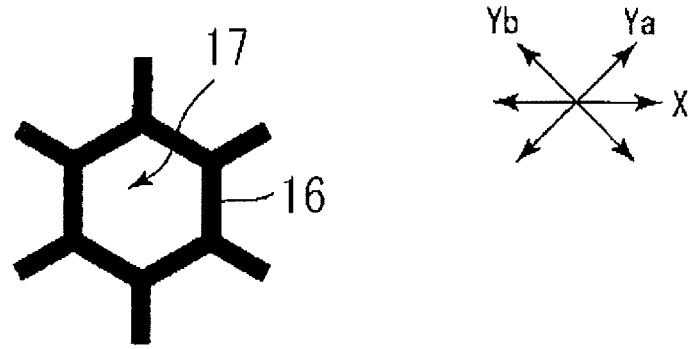
FIG. 4 is an explanatory drawing which shows an enlarged view of another example of a mesh structure.
Figure 5:
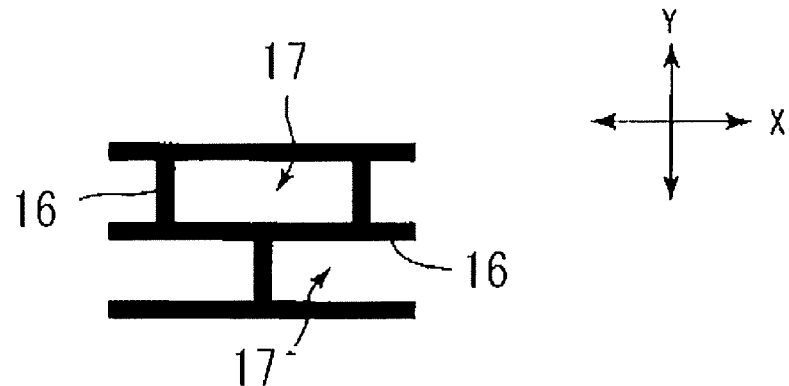
FIG. 5 is an explanatory drawing which shows an enlarged view of another example of a mesh structure.

FIGS. 3 to 5 show enlarged views of examples of the mesh structure that is able to be applied to the present invention. Note that these drawings are shown for explaining the shape of the opening and the lines are depicted in a uniform width irrespective of the embodiment.

A mesh pattern shown in FIG. 3 is that quadrangles are sequenced in X direction and Y direction, as cores and corresponds to the first electrode pattern 25a and the second electrode pattern 25b of FIG. 1 shown above. Here, in the first electrode pattern 25a and the second electrode pattern 25b shown in FIG. 1, both have the rectangular core, but the sizes of the cores are different from each other. In more detail, the size of the plural cores arranged in Y direction in the first electrode pattern 25a is comparable to the size of the single core in the second electrode pattern 25b.

A mesh pattern shown in FIG. 4 is that hexagons are sequenced in X direction, Ya direction and b direction as cores.

A mesh pattern shown in FIG. 5 is that ladder shapes are sequenced in X direction and Y direction.

Among quadrangles, it is particularly preferable that squares are sequenced as cores, since the mesh pattern is hardly recognized in a streak form as compared to other polygonal shapes.

That is, when seeing a pattern in which certain shapes are sequenced regularly as cores, the outline (the conductive fine line 16) tends to be seen like a successive streak form along the sequenced direction of the cores. For example, in the case that the core is formed of a hexagon, since the line shape of the conductive fine line 16 in the sequenced direction is made zigzag, it becomes to be seen thick for amplitude of the zigzag, and as a result, the line width of the conductive fine line 16 is seen to be an expanded state. In this respect, in the case that the core is formed of a square, since the line shape of the conductive fine line 16 in the sequenced direction is made straight, it is less likely to be seen thicker than the original width, whereby its presence is hardly recognized and the mesh pattern is not noticeable.

Further, in the case that the core is formed of a rectangle, since a pitch in the long side direction of the rectangle is different from that in the short side direction thereof, the short side direction whose pitch is shorter than in the long side direction appears darker, seen in overall, that forms streaks and tends to cause flickering; however, in the case that squares are sequenced as cores, such streaks are not appeared and unnoticeable. Here, the above-described square is not limited to a completely angular square, but includes a chamfered square.

The "polygonal shape" in the present specification includes not only geometrically perfect polygon shapes but also "substantial polygonal shapes", that a minor change is applied to complete polygonal shapes. Examples of the minor change include an addition of a point element or a line element which is minor relative to the mesh, a partial deficiency of each side (the conductive fine line 16) constituting the mesh, and the like. For example, in the example shown in FIG. 1, linear projections 40 facing a gap 20 between the first electrode patterns 25a are present, whereby the boundary between the gap 20 and the first electrode pattern 25a is obscured and made inconspicuous.

By combining the first conductive part and the second conductive part like the above, a mesh pattern to which the first electrode pattern 25a and the second electrode pattern 25b are projected (hereinafter referred to as a projected mesh pattern) is formed in a plan view at a part where optical transparency is required.

In the present embodiment, as shown in FIG. 1, the size of plural cores arranged in Y direction in the first electrode pattern 25a is comparable to the size of the single core in the second electrode pattern 25b. Therefore, by adjusting positions of the both patterns, the projected mesh pattern is formed in a pattern such that the cores of the first electrode pattern 25a are sequenced in X direction and Y direction to be made almost uniform at a whole part where optical transparency is required.

Regarding line width of the projected mesh pattern, the lower limit thereof is preferably 1 μm or more, 3 μm or more, 4 μm or more, or 5 μm or more, and the upper limit thereof is preferably 15 μm or less, 10 μm or less, 9 μm or less, or 8 μm or less. When the line width is less than the lower limit, the conductivity is insufficient and thus detection sensitivity of the touch panel is made insufficient. Meanwhile, when exceeding the upper limit, visibility may be deteriorated.

Aperture ratio of the projected mesh pattern is preferably 85% or more, in view of transmittance of visible light, more preferably 90% or more, and most preferably 95% or more. The aperture ratio means a percentage of a translucency part in the entirety.

(Measures Against Line Thickening Due to Positioning Deviation)

Figure 6:
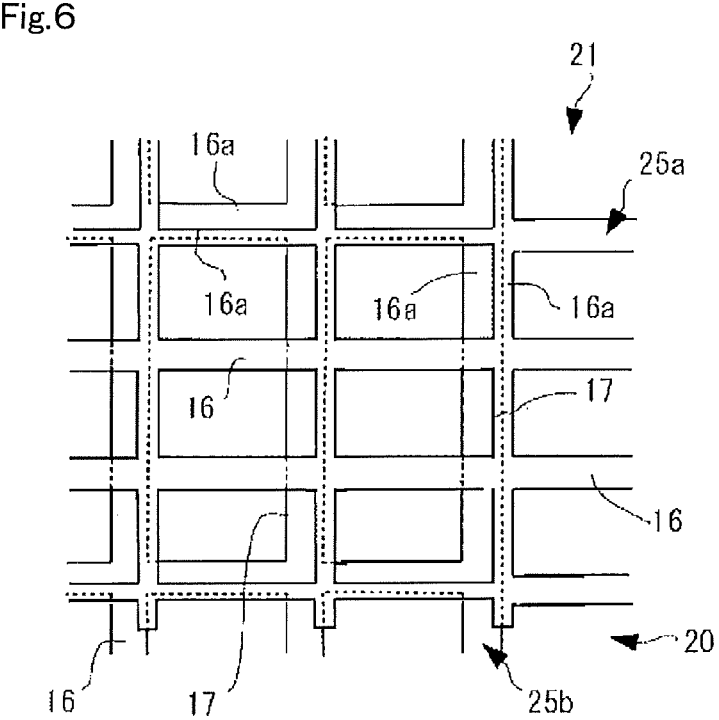
FIG. 6 shows an example of lines which are suppressed to be thickened in the present invention.

In the electrode sheet for a capacitance-type touch panel of the present embodiment, the first electrode pattern 25a and the second electrode pattern 25b have line segments 16a of the conductive fine lines 16, that are facing each other across the substrate 12, and the conductive fine line in the first electrode pattern 25a is formed narrower in line width than that in the second electrode pattern 25b only at this facing line segment 16a, thereby formed to have a non-uniform line width (see FIG. 6). In FIG. 6, the line segment 16a facing across the substrate 12 is composed of the outline of the quadrangle that forms the core of the mesh structure in the second electrode pattern 25b. In the conductive fine line of the first electrode pattern 25a, which has a finer mesh, only a part of the outline of the quadrangle that forms the core of the mesh structure comprises the facing line segment 16a.

In addition, the conductive fine lines do not face each other across the substrate 12 also at the gap 20 positioned between the first electrode patterns 25a and the gap 21 positioned between the second electrode patterns 25b shown in FIG. 1. Note that, in the exploded view of the electrode sheet shown in FIG. 1, the conductive fine lines are drawn in a uniform width, since it is difficult to depict the conductive fine line such that difference of these line widths can be distinguished by the naked eyes.

Figure 7:
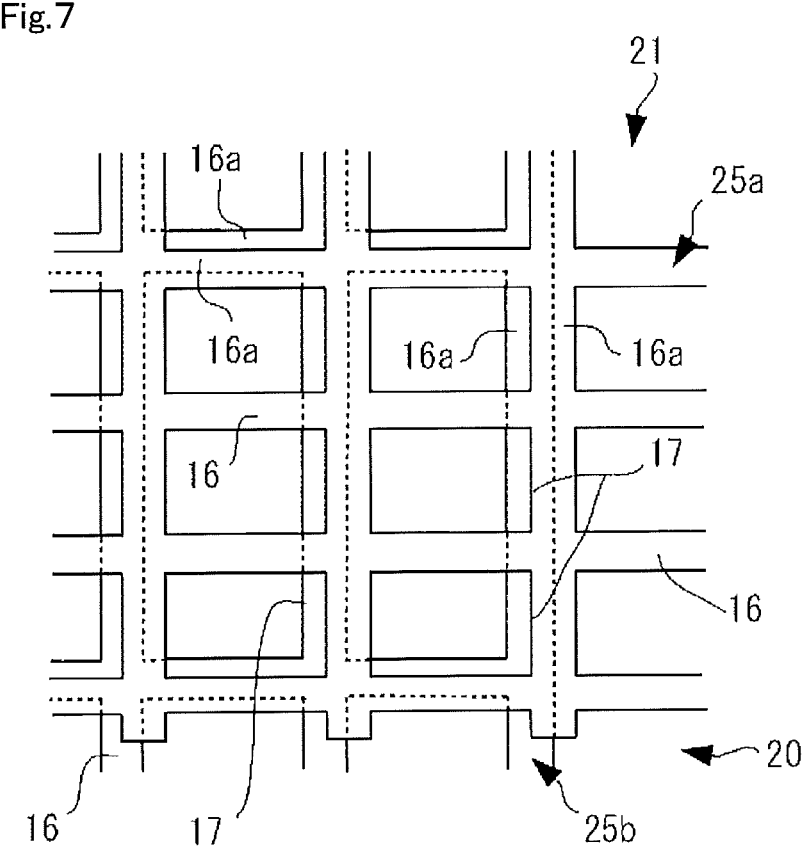
FIG. 7 shows an example of a thickened state of lines in a conventional technology.

Here, for example, in the case where widths of the fine lines in the first electrode pattern 25a and the second electrode pattern 25b are equal to each other as in a conventional technology, the projected mesh pattern is made to have a thickened line, due to a positioning deviation in overlap of the first electrode pattern 25a and the second electrode pattern 25b (see FIG. 7). Thereby, a problem is caused that the conductive fine line is recognized by a touch user. Moreover, an area of a transparent region is reduced for the thickened line, that also causes a problem of lowering light transmittance from the display device. In FIG. 7, reference numerals are indicated to correspond to those in FIG. 6.

In contrast to the above, in the present embodiment, difference of the width of the fine lines between the first electrode pattern 25a and the second electrode pattern 25b is provided at a part where the conductive fine lines in the first electrode pattern 25a and the second electrode pattern 25b face each other across the substrate 12, as described above, and therefore, even when the positioning deviation in overlap of the first electrode pattern 25a and the second electrode pattern 25b occurs, a part or all of the deviation (see FIG. 6) can be absorbed in the line width difference. Accordingly, the projected mesh pattern is suppressed to have the thickened line, thereby improving visibility and transparency. Meanwhile, at a part where the conductive fine lines do not face each other across the substrate 12, the line width can be visually recognized as its width in a plan view, and therefore, difference of the fine line widths between the first electrode pattern 25a and the second electrode pattern 25b is not set thinly.

The narrowed ratio in the facing line segment 16a of the above-described is in the range of 30% to 90%, more preferably 40% to 80%, even more preferably 50% to 70%. When the narrowed ratio is less than the lower limit, conductivity becomes insufficient and thus detection sensitivity of the touch panel is made insufficient. Meanwhile, when exceeding the upper limit, it may be difficult to suppress the line thickening in the positioning deviation.

(Method of Forming a Conductive Pattern in the Electrode Sheet)

Hereinafter, a method for forming the first electrode pattern 25a and the second electrode pattern 25b of the present embodiment is explained.

Examples of a forming method of the first electrode pattern 25a and the second electrode pattern 25b include: a first forming method of forming a photosensitive layer on a surface of an opaque conductive layer, exposing and developing the photosensitive layer to cover the surface of the conductive layer partially, and then removing the exposed portion of the conductive layer by etching to form the first electrode pattern 25a and the second electrode pattern 25b on both surface of the substrate 12, respectively; and a second forming method of forming the first electrode pattern 25a and the second electrode pattern 25b on both surface of the substrate 12, respectively, by printing.

1) First Forming Method

The first forming method is explained here. First, an elongated laminated raw material 110 is prepared. The laminated raw material 110 comprises a transparent substrate 12, an opaque first conductive layer 115a and a first photosensitive layer 113a, that are formed by laminating on one principal surface of the substrate 12 sequentially, and an opaque second conductive layer 115b and a second photosensitive layer 113b, that are formed by laminating on the other principal surface of the substrate 12 sequentially.

The first conductive layer 115a and the second conductive layer 115b made of the above-described metal or alloy can be formed by non-electrolytic plating, sputtering, or a metal thin film forming method such as lamination of a metal foil. Further, these forming method may be combined with electrolytic plating.

Figure 8:
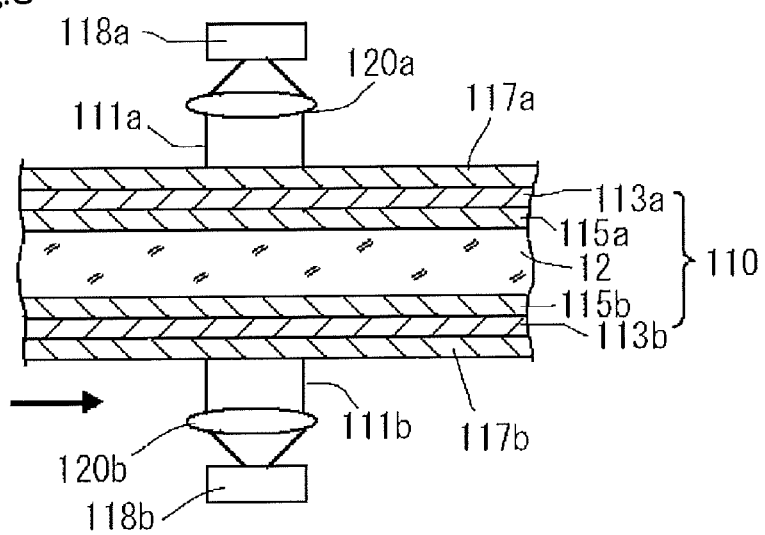
FIG. 8 is an explanatory drawing which shows double-sided simultaneous exposure.

Then, the laminated raw material 110 is exposed. In this exposure process, as shown in FIG. 8, a first exposure process of irradiating light toward the substrate 12, as to the first photosensitive layer 113a, to expose the first photosensitive layer 113a along the first exposure pattern and a second exposure process of irradiating light toward the substrate 12, as to the second photosensitive layer 113b, to expose the second photosensitive layer 113b along the second exposure pattern are conducted (double-sided simultaneous exposure). In the example of FIG. 8, while the elongated laminated raw material 110 is conveyed in one direction, a first light 111a (parallel light) is irradiated on the first photosensitive layer 113a via a first photomask 117a as well as a second light 111b (parallel light) is irradiated on the second photosensitive layer 113b via a second photomask 117b. The first light 111a is obtained by converting a light emitted from a first light source 118a to a parallel light with a first collimator lens 120a on the way, and the second light 111b is obtained by converting a light emitted from a second light source 118b to a parallel light with a second collimator lens 120b on the way. The example of FIG. 8 shows the case where two light sources (the first light source 118a and the second light source 118*b*) are used; however, a light emitted from one light source may be divided by through an optical system to irradiate the first photosensitive layer 113*a* and the second photosensitive layer 113*b* as the first light 111*a* and the second light 111*b*.

In the first exposure process, as shown in FIG. 8, the first photomask 117*a* is, for example, arranged closely on the photosensitive layer 113*a* and the first light 111*a* is irradiated toward the first photomask 117*a* from the first light source 118*a* which is placed facing to the first photomask 117*a* to exposure the first photosensitive layer 113*a*. The first photomask 117*a* comprises a glass substrate made of a transparent soda glass and a mask pattern (the first exposure pattern) formed on the glass substrate. Therefore, by the first exposure process, the first photosensitive layer 113*a* is exposed along the first exposure pattern formed in the first photomask 117*a*.

Likewise, in the second exposure process, the second photomask 117*b* is, for example, arranged closely on the photosensitive layer 113*b* and the second light 111*b* is irradiated toward the second photomask 117*b* from the second light source 118*b* which is placed facing to the second photomask 117*b* to exposure the second photosensitive layer 113*b*. The second photomask 117*b* comprises a glass substrate made of a transparent soda glass and a mask pattern (the second exposure pattern) formed on the glass substrate, as with the first photomask 117*a*. Therefore, by the second exposure process, the second photosensitive layer 113*b* is exposed along the second exposure pattern formed in the second photomask 117*b*.

In the first exposure process and the second exposure process, emission timing of the first light 111*a* from the first light source 118*a* and emission timing of the second light 111*b* from the second light source 118*b* may be the same or different from each other. When the timings are the same, the first photosensitive layer 113*a* and the second photosensitive layer 113*b* can be exposed simultaneously in one exposure process, thereby enabling shortening of the processing time.

And, the first light 111*a* from the first light source 118*a* that is irradiated to the first photosensitive layer 113*a* is blocked by the opaque first conductive layer 115*a* and the second conductive layer 115*b* not to reach the second photosensitive layer 113*b* substantially, and the second light 111*b* from the second light source 118*b* that is irradiated to the second photoconductive layer 113*b* is blocked by the opaque second conductive layer 115*b* and the first conductive layer 115*a* not to reach the first photosensitive layer 113*a* substantially. Therefore, it is possible to form any different etching patterns on both (top and bottom) surfaces of the substrate 12, and further, with high positional accuracy to the top and bottom surfaces. Here, the term "not reach substantially" indicates the case where light does not reach or the case where amount of light is not sufficient for imaging in image development though light reaches. Therefore, the term "light reaches" means that light having sufficient amount of light for imaging in image development reaches.

Then, the laminated raw material 110 after exposure is subjected to a development process, whereby a first etching pattern and a second etching pattern are formed (not shown in the drawings). The first etching pattern is formed on the surface having the first conductive layer 115*a* of the transparent substrate 12 along the first exposure pattern, and the second etching pattern is formed on the surface having the second conductive layer 115*b* of the transparent substrate 12 along the second exposure pattern. On this occasion, the first conductive layer 115*a* and the second conductive layer 115*b* are exposed at non-forming portions of the first etching pattern and the second etching pattern.

Thereafter, the laminated raw material 110 is etched, whereby the first electrode pattern 25*a* and the second electrode pattern 25*b* are formed, as shown in FIG. 2. The first electrode pattern 25*a* is formed on the one principal surface 12*a* of the transparent substrate 12 by etching the exposed portion of the first conductive layer 115*a* to remove, and the second electrode pattern 25*b* is formed on the other principal surface 12*b* of the transparent substrate 12 by etching the exposed portion of the second conductive layer 115*b* to remove. The first electrode pattern 25*a* and the second electrode patterns 25*b* may be further subjected to a physical development and/or a plate processing, whereby a conductive metal may be supported on the first electrode pattern 25*a* and the second electrode pattern 25*b*.

In this first forming method, it is desired that the positional deviation does not occur between the arrangement of the first photomask 117*a* in the first exposure process and the arrangement of the second photomask 117*b* in the second exposure process; however, it is difficult to eliminate the positional deviation completely. That is, it is difficult to avoid forming the slight positional deviation between the arrangement of the first electrode pattern 25*a* formed on the one principal surface 12*a* of the substrate 12 and the arrangement of the second electrode pattern 25*b* formed on the other principal surface 12*b* of the substrate 12. Therefore, as described above, it is needed that difference of the fine line widths between the first electrode pattern 25*a* and the second electrode pattern 25*b* is provided at a part where the conductive fine lines in the first electrode pattern 25*a* and the second electrode pattern 25*b* face each other across the substrate 12.

2) Second Forming Method

Meanwhile, in the second forming method, the first electrode pattern 25*a* is formed by printing an ink 132 containing an opaque conductive material on one principal surface 12*a* of the substrate 12, and likewise, the second electrode pattern 25*b* is formed by printing an ink 132 containing an opaque conductive material on the other principal surface 12*b* of the substrate 12 (see FIG. 2). In this case, timing of printing the ink (the ink for the first electrode pattern 25*a*) on the one principle surface 12*a* of the substrate 12 and timing of printing the ink (the ink for the second electrode pattern 25*b*) on the other surface 12*b* of the substrate 12 may be the same or different from each other. When the timings are the same, the first electrode pattern 25*a* and the second electrode pattern 25*b* can be formed on both (top and bottom) surfaces of the substrate 12, respectively, in one printing process, thereby enabling shortening of the print processing time.

Also in this second forming method, it is difficult to avoid forming the slight positional deviation between the arrangement of the first electrode pattern 25*a* printed on the one principal surface 12*a* of the substrate 12 and the arrangement of the second electrode pattern 25*b* printed on the other principal surface 12*b* of the substrate 12. Therefore, also in the second forming method, it is needed that difference of the fine line widths between the first electrode pattern 25*a* and the second electrode pattern 25*b* is provided at a part where the conductive fine lines in the first electrode pattern 25*a* and the second electrode pattern 25*b* face each other across the substrate 12.

(Other Constitutions)

As described above, each of the first conductive part 14*a* and the second conductive part 14*b* has a part where optical transparency is required (that is the first sensor part 24*a* and the second sensor part 24b) and a part where optical transparency is not required (that is the first terminal wiring part 34a and the second terminal wiring part 34b).

In the first terminal wiring part 34a, a plurality of first terminals (not shown in the drawings) are formed and arranged at a center part of the longitudinal direction in a peripheral part of one side of the electrode sheet 1. And a first terminal wiring pattern 35a is derived from either one end of the each first electrode pattern 25a, routed toward the first terminal, and electrically connected to the corresponding first terminal, respectively. Also in the second terminal wiring part 34b, a plurality of second terminals (not shown in the drawings) are formed and arranged at a center part of the longitudinal direction in a peripheral part of one side of the electrode sheet 1. And the second terminal wiring pattern 35b is derived from either one end of the each second electrode pattern 25b, routed toward the second terminal, and electrically connected to the corresponding second terminal, respectively.

The first terminal wiring pattern 35a and the second terminal wiring pattern 35b can be formed simultaneously with the first electrode pattern 25a and the second electrode pattern 25b, using the same material and the same pattern forming method as the first electrode pattern 25a and the second electrode pattern 25b. The first terminal wiring pattern 35a and the second terminal wiring patterns 35b may be formed to have, for example, a width of 25 μm or more and 500 μm or less and a length of 10 mm or more, and resistance of 300 ohms or less, preferably 100 ohms or less per 10 mm. Of course, the first terminal wiring pattern 35a and the second terminal wiring patterns 35b may be formed, using the different material or the different pattern forming method from the first electrode pattern 25a and the second electrode pattern 25b.

In the case that a tach panel is composed of the electrode sheet 1, it comprises a cover member laminated on either one of the principal surfaces of the electrode sheet 1, a flexible substrate connected electrically to the electrode sheet 1 via a cable, and an IC circuit mounted on the flexible substrate, in addition to the electrode sheet 1 described above.

By contacting a fingertip on the cover member, signals from the first electrode pattern 25a and the second electrode pattern 25b facing the fingertip are transmitted to the IC circuit. The IC circuit calculates the position of the fingertip on the basis of the supplied signals. Therefore, even in the case where two fingertips are contacted simultaneously, it is possible to detect the position of each fingertip. Examples of the display to which this tach panel is applied include a liquid crystal panel, a plasma panel, an organic EL panel, an inorganic EL panel and others. In a capacitance-type touch panel, as an area overlapping the first electrode pattern 25a and the second electrode pattern 25b increases, detection sensitivity becomes high.

As described above, the first embodiment of the present invention is explained, however, the present invention is not limited to the first embodiment. For example, the below-described respective embodiments are also allowed. Hereinafter, explanation of the constitution which is common to the first embodiment is omitted.

Second Embodiment

Figure 9:
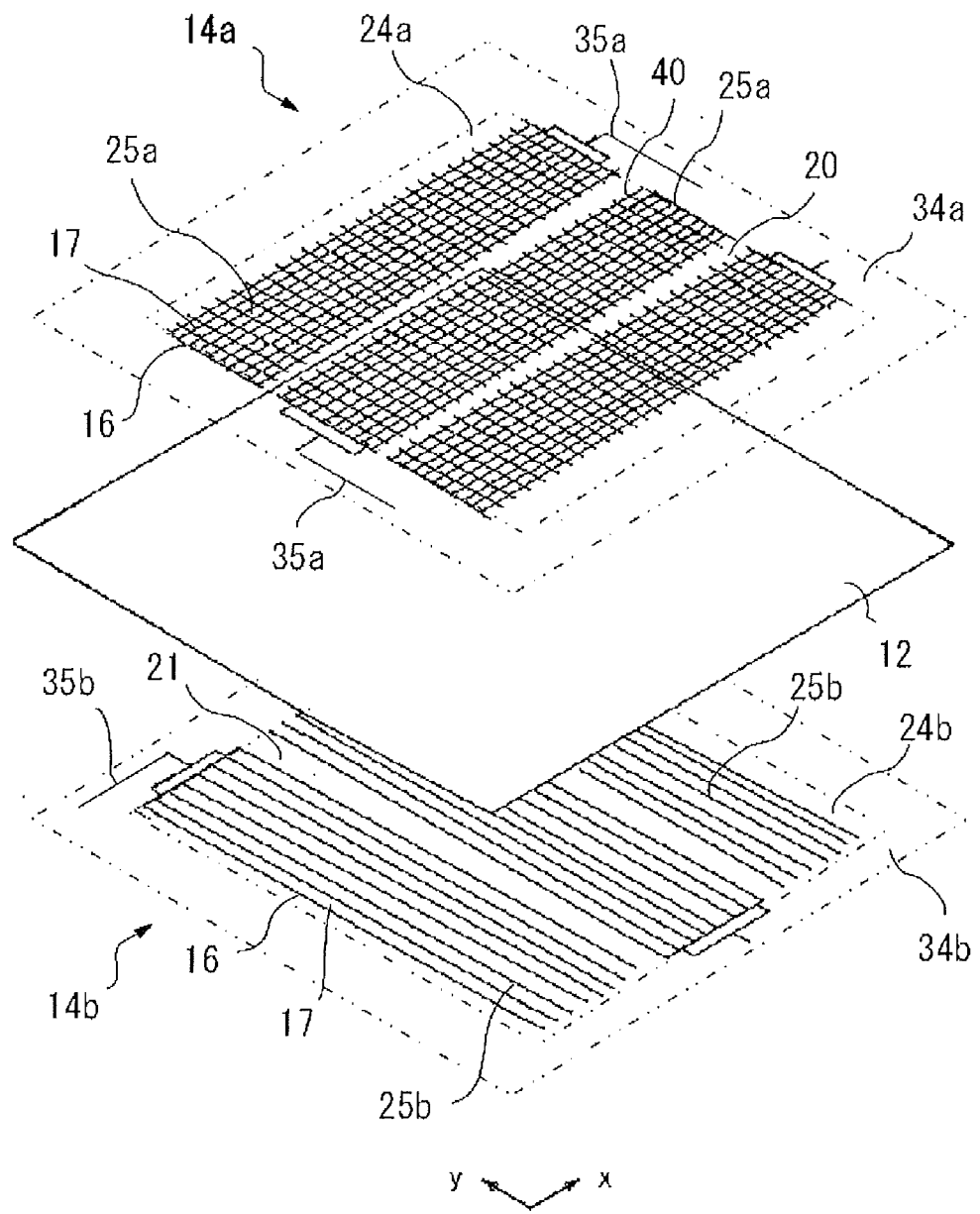
FIG. 9 shows an exploded perspective view, which is omitted partially, of another example of an electrode sheet for a capacitance-type touch panel of the present invention.
Figure 10:
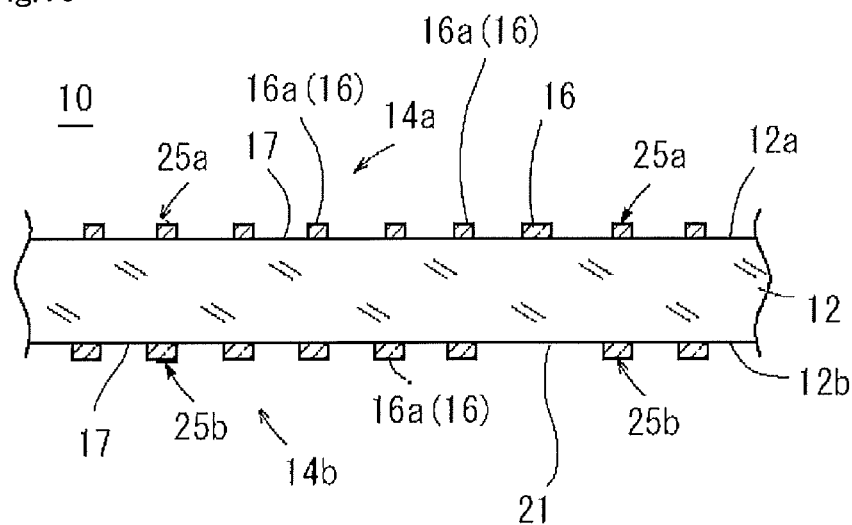
FIG. 10 shows a cross-sectional view, which is omitted partially, of another example of an electrode sheet for a capacitance-type touch panel of the present invention.

In the first embodiment, each of the first electrode pattern 25a and the second electrode pattern 25b has a mesh structure; however, the first electrode pattern 25a and the second electrode pattern 25b are not limited to the mesh structure as long as they are composed of an opaque conductive fine line 16 and a blank part 17 partitioned by the conductive fine line. For example, the second electrode pattern 25b may be formed in a comb-shape in which teeth are arranged in X direction as shown in FIG. 9 (second embodiment), instead of the mesh structure. FIG. 10 shows a cross-sectional view of one of the first electrode pattern 25a in the electrode sheet shown in FIG. 9 across the longitudinal direction thereof.

In FIG. 9, the line segments 16a facing across the substrate 12 are comprised from teeth of the comb-shape in the second electrode pattern 25b. In the conductive fine line of the first electrode pattern 25a, only a part of the outline of the quadrangle that forms the core of the mesh structure comprises the facing line segment 16a.

The conductive fine lines do not face each other across the substrate 12 also at the gap 20 positioned between the first electrode patterns 25a and the gap 21 positioned between the second electrode patterns 25b shown in FIG. 9. Note that, in the exploded view of the electrode sheet shown in FIG. 9, the conductive fine lines are drawn in a uniform width, since it is difficult to depict the conductive fine line such that difference of these line widths can be distinguished by the naked eyes.

Also in the present embodiment, by combining the first conductive part and the second conductive part, a projected mesh pattern is formed at a part where optical transparency is required in a plan view. In the present embodiment, the plural cores arranged in Y direction in the first electrode pattern 25a just fit in one of the teeth in the second electrode pattern 25b. Therefore, by adjusting positions of both patterns, the projected mesh pattern is formed in a pattern such that the cores of the first electrode pattern 25a are sequenced in X direction and Y direction to be made almost uniform at a whole part where optical transparency is required.

Figure 11:
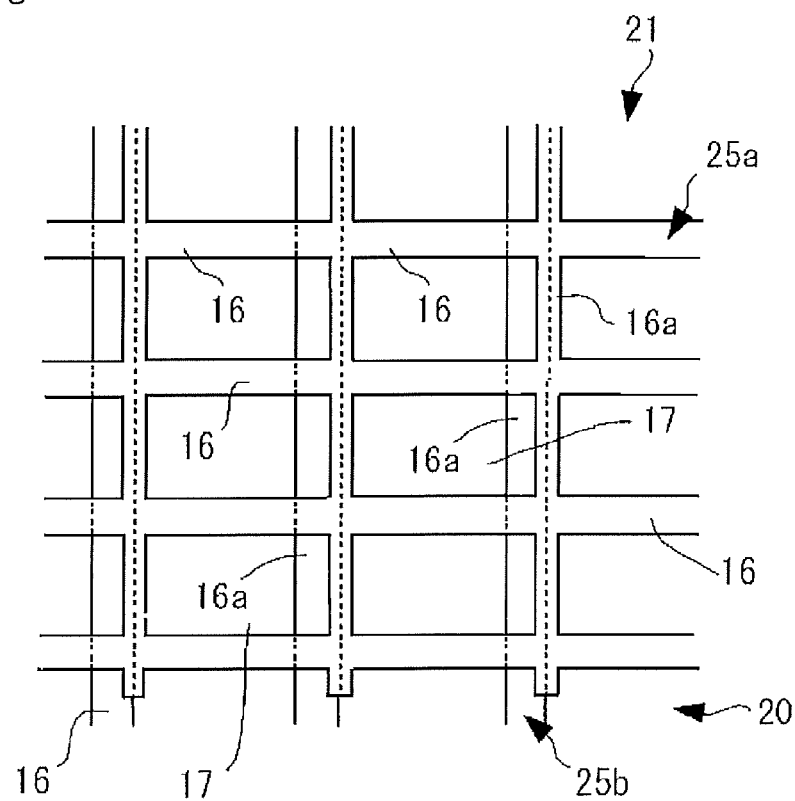
FIG. 11 shows another example of lines which are suppressed to be thickened in the present invention.
Figure 12:
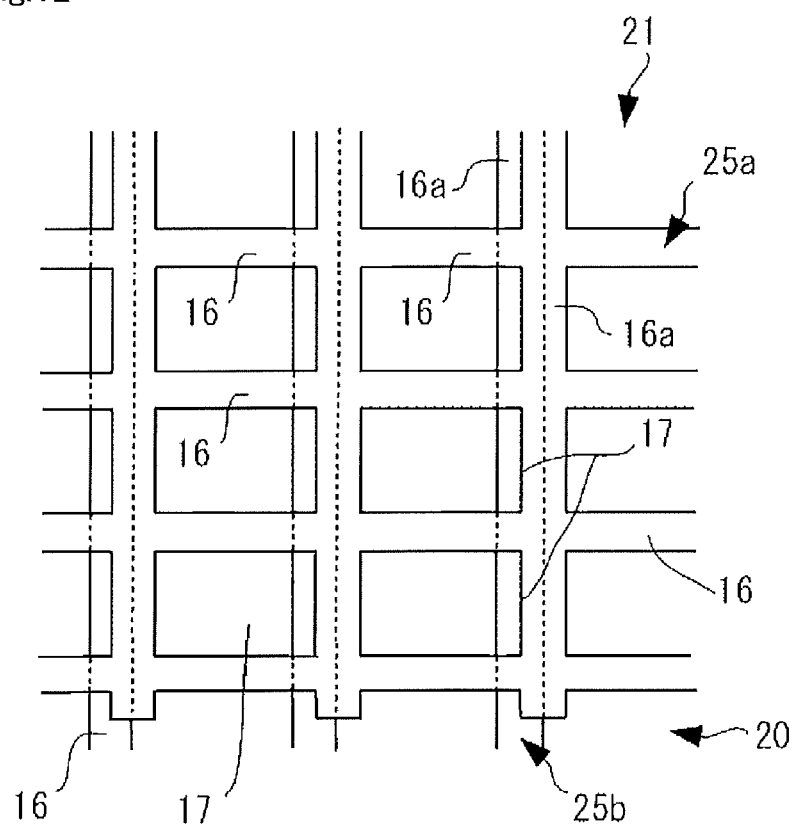
FIG. 12 shows another example of a thickened state of lines in a conventional technology.

As described above, difference of the fine line widths between the first electrode pattern 25a and the second electrode pattern 25b is provided at the part 16a where the conductive fine lines 16 in the first electrode pattern 25a and the second electrode pattern 25b face each other across the substrate 12, and therefore, even when the positioning deviation in overlap of the first electrode pattern 25a and the second electrode pattern 25b occurs, a part or all of the deviation (see FIG. 11) can be absorbed in the line width difference. Accordingly, the projected mesh pattern is suppressed to have the thickened line, thereby improving visibility. Meanwhile, at a part where the conductive fine lines do not face each other across the substrate 12, the line width can be visually recognized as its width in a plan view, and therefore, difference of the fine line widths between the first electrode pattern 25a and the second electrode pattern 25b is not set thinly. Here, FIG. 12 shows an example of the case of not preparing the line thickening.

Other constitutions are the same as the first embodiment.

Third Embodiment

Figure 13:
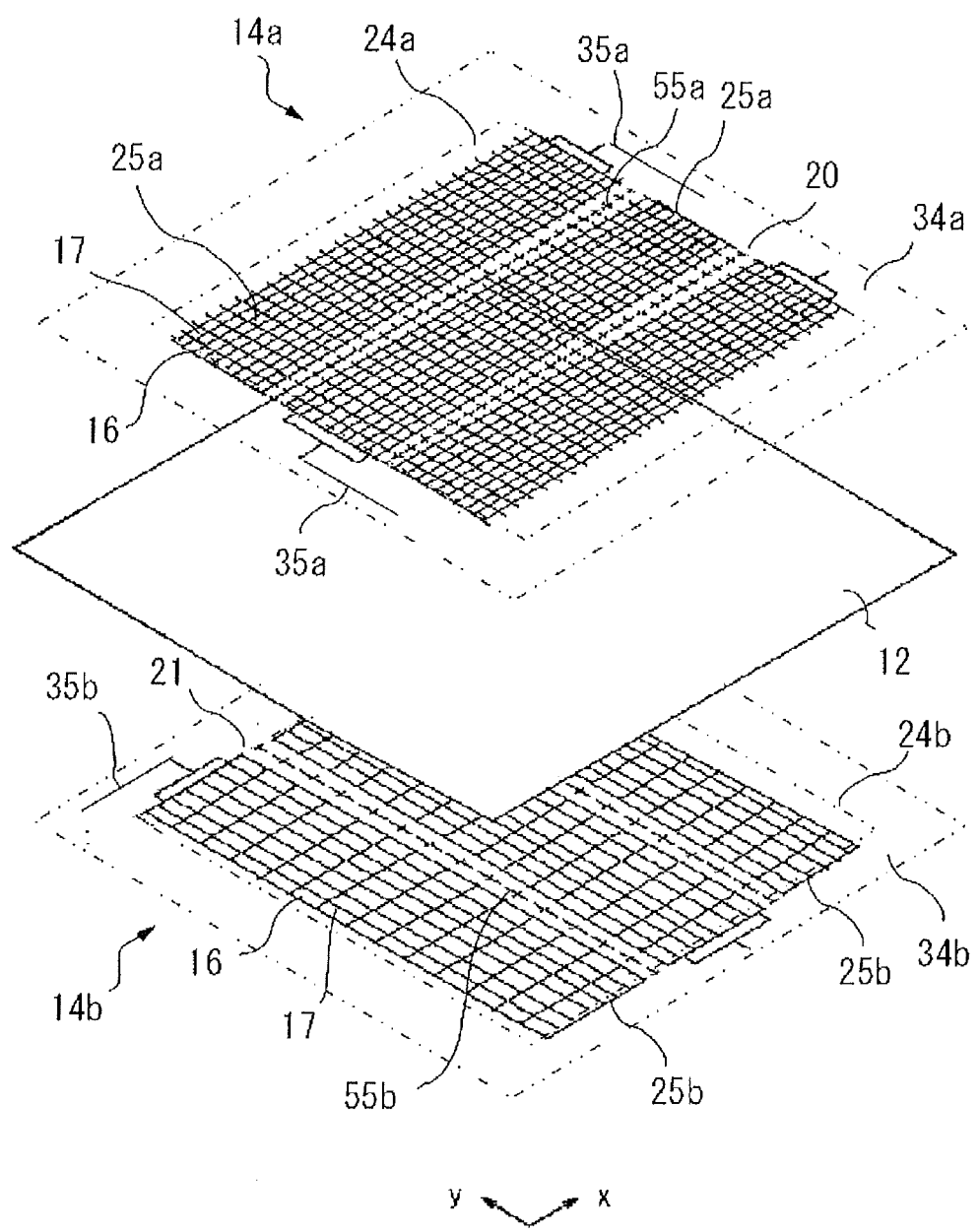
FIG. 13 shows an exploded perspective view, which is omitted partially, of another example of an electrode sheet for a capacitance-type touch panel of the present invention.
Figure 14:
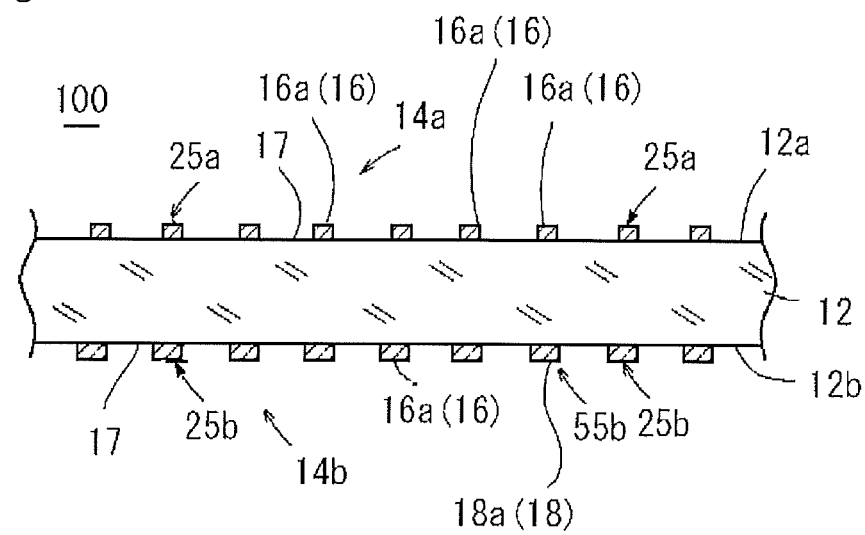
FIG. 14 shows a cross-sectional view, which is omitted partially, of another example of an electrode sheet for a capacitance-type touch panel of the present invention.

In the first embodiment, nothing is provided at the gap 20 between the adjacent first electrode patterns 25a and the gap 21 between the adjacent second electrode patterns 25b in the first conductive part 14a and the second conductive part 14b; however, the present invention is not limited thereto. For example, as shown in FIG. 13, the first conductive part 14a has a plurality of first dummy patterns 55a, that are composed of a conductive fine line 18 made of the same material as the first electrode pattern 25a, placed at the gap 20 between the adjacent first electrode patterns 25a, and insulated electrically from the first electrode pattern 25a; and the second conductive part 14b has a plurality of second dummy patterns 55b, that are composed of a conductive fine line 18 made of the same material as the second electrode pattern 25b, placed at the gap 21 between the adjacent second electrode patterns 25b, and insulated electrically from the second electrode pattern 25b (third embodiment). FIG. 14 shows a cross-sectional view of one of the first electrode pattern 25a in the electrode sheet shown in FIG. 13 across the longitudinal direction thereof.

The first dummy pattern 55a and the second dummy pattern 55b complement so that the gap 20 between the first electrode patterns 25a and the gap 21 between the second electrode patterns 25b are made inconspicuous. Thus, they make it appear as if the blank parts 17 (openings in the first embodiment) partitioned by the conductive fine lines 16 in the first electrode pattern 25a and the second electrode pattern 25b are present sequentially also in the gaps 20, 21.

The first dummy pattern 55a is formed simultaneously with the first electrode pattern 25a during the patterning of the first electrode pattern 25a. Likewise, the second dummy pattern 55b is formed simultaneously with the second electrode pattern 25b during the patterning of the second electrode pattern 25b.

In the first embodiment, the conductive fine line 16 in the first electrode pattern 25a is formed narrower in line width than the conductive fine line 16 in the second electrode pattern 25b only at the line segment 16a facing the second electrode pattern 25b across the substrate 12. In contrast to this, in the present embodiment, since the conductive fine line 16 in the first electrode pattern 25a also faces the conductive fine line 18 in the second dummy pattern (the facing portion of the dummy pattern is marked with 18a in the drawings), the conductive fine line 16 in the first electrode pattern 25a is preferably formed narrower in line width also at this portion.

Figure 15:
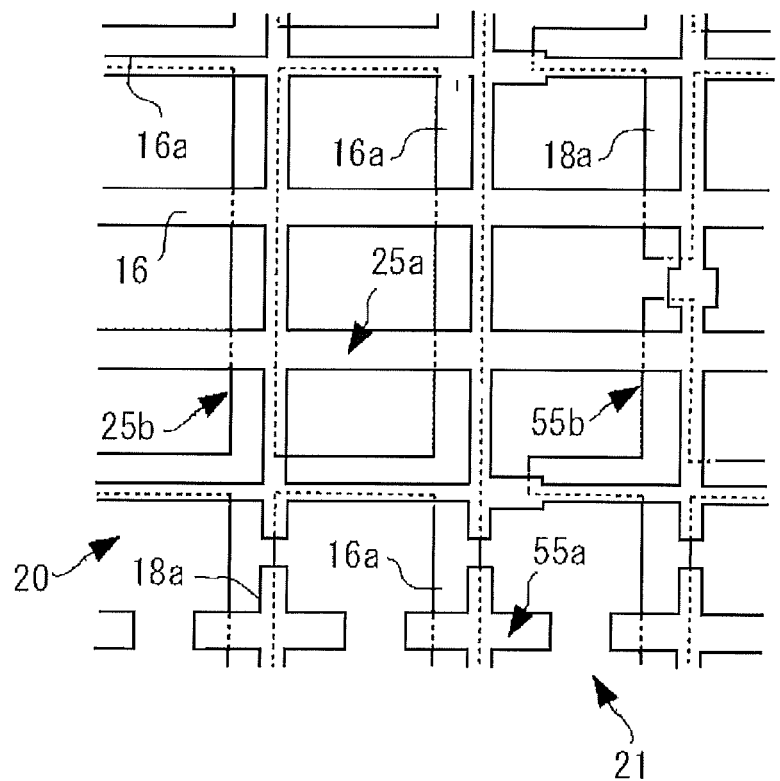
FIG. 15 shows another example of lines which are suppressed to be thickened in the present invention.
Figure 16:
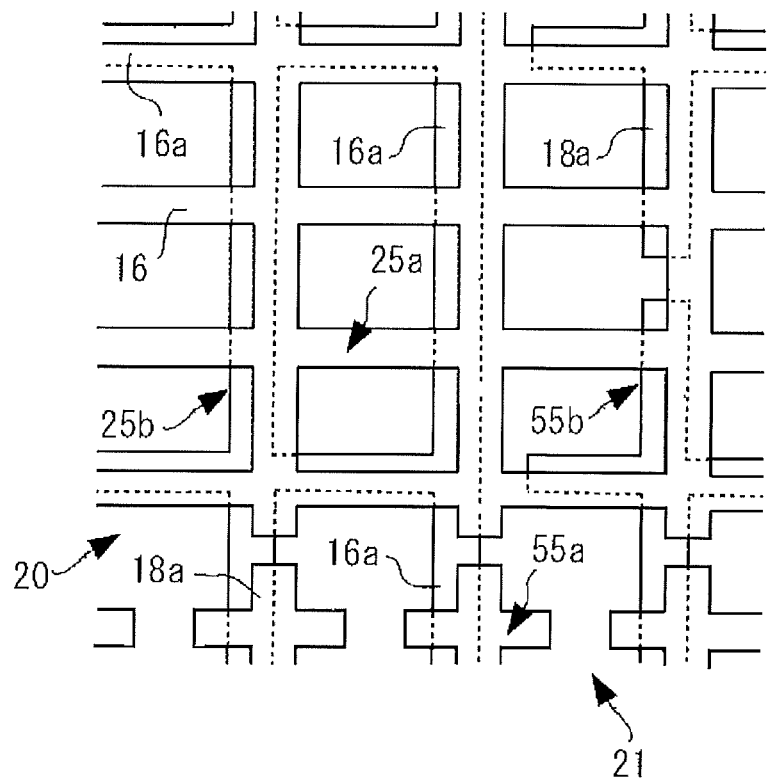
FIG. 16 shows another example of a thickened state of lines in a conventional technology.

Thereby, even when the positioning deviation in overlap of the pattern including the first dummy pattern 55a of the first electrode pattern 25a side and the pattern including the second dummy pattern 55b of the second electrode pattern 25b side occurs, a part or all of the deviation (see FIG. 15) can be absorbed in the line width difference. Accordingly, the projected mesh pattern is suppressed to have the thickened line, thereby improving visibility and transparency. Here, FIG. 16 shows an example of the case of not preparing the line thickening.

Other constitutions are the same as the first embodiment.

Fourth Embodiment

In the first to third embodiments, the conductive fine line 16 constituting the first electrode pattern 25a and the second electrode pattern 25b is made of a metal fine line; however, the first conductive part and the second conductive part of the present invention is not limited thereto. For example, the conductive fine line may be a non-metal fine line containing one or more material selected from the group consisting of carbon, carbon nanotube and graphene (fourth embodiment).

In the method of forming the first electrode pattern 25a and the second electrode pattern 25b in the present embodiment, a photosensitive layer is not formed separately on the surface of the opaque conductive layer to be subjected to exposure, development and etching as in the first to third embodiments. Specifically, it is different in that a laminated raw material 120 provided with a first conductive photosensitive layer 123a and a second conductive photosensitive layer 123b, that are opaque and one or more material selected from the group consisting of carbon, carbon nanotube and graphene of the above described is dispersed in, on both surfaces of the substrate 12 is exposed, developed and baked, thereby forming the first electrode pattern 25a and the second electrode pattern 25b on both surfaces of the substrate 12, respectively.

Figure 17:
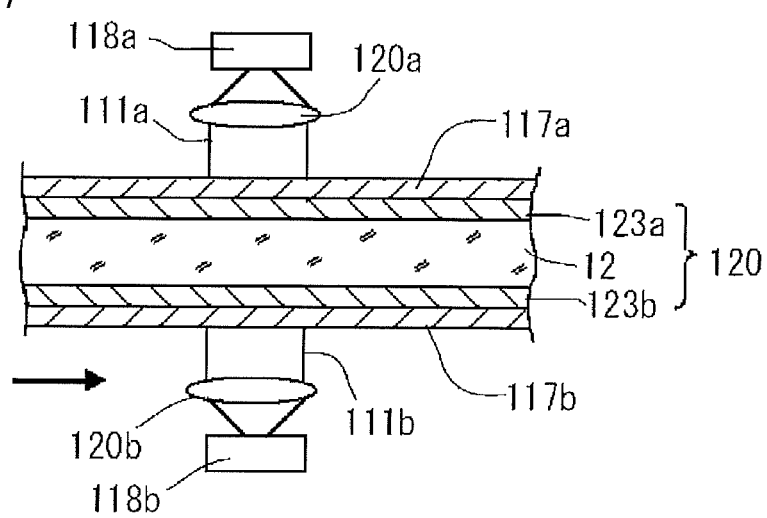
FIG. 17 is an explanatory drawing which shows another example of double-sided simultaneous exposure.

However, it is the same in that the exposure step (see FIG. 17) is present as with the first to third embodiments and complete suppression of the positional deviation between the arrangement of the first photomask 117a in the first exposure process and the arrangement of the second photomask 117b in the second exposure process is difficult. Accordingly, also in the present embodiment, difference of the fine line widths between the first electrode pattern 25a and the second electrode pattern 25b is provided at a part where the conductive fine lines in the first electrode pattern 25a and the second electrode pattern 25b face each other across the substrate 12, thereby suppressing the line thickening due to the positioning deviation.

Other constitutions are the same as the first embodiment.

Examples of Variations

Furthermore, it is preferred that the arrangement directions of the first electrode pattern 25a and the second electrode pattern 25b are designed so that moire pattern does not appear by interference with pixel of the display device. For example, in order to suppress appearance of moire, the arrangement direction of the first electrode pattern 25a and the arrangement direction of the second electrode pattern 25b may be inclined to the arrangement direction of pixel of the display device. Inclination of the first electrode pattern 25a and the second electrode pattern 25b provides displacement of the detected position information; however, a position correcting circuit for correcting the position information according to the set inclination angle may be incorporated in the IC circuit.

As another of moire measures, the first electrode pattern 25a and the second electrode pattern 25b may be designed such that pitches between adjacent conductive fine lines are not constant. Or, the conductive fine line may be designed in a curved shape.

Furthermore, though in the first embodiment, the first electrode pattern 25a and the second electrode patterns 25b are composed of only a metal fine line, and in the fourth embodiment, those are composed of only a non-metal fine line, the present invention is not limited to those. That is, it is also possible that one of the first electrode pattern 25a and the second electrode patterns 25b is composed of a metal fine line and the other of that is composed of a non-metal fine line.

In the case where the conductive fine lines 16, 18 are metal fine lines, when a touch side surface of the conductive fine line is made a low-reflection treatment, reflection color of the metal is suppressed and the presence of the electrode pattern is made inconspicuous. Further, when an opposite surface of the touch side of the conductive fine line is also made a low-reflection treatment, the reflected color from the opposite surface is not reflected on the display screen, resulting in improving visibility, that are particularly preferable.

Specific examples of the low-reflection treatment include a surface treatment such as a chemical conversion treatment and a plating treatment. The chemical treatment is to form a low-reflection layer on a metal surface by oxidation treatment or sulfide treatment, and for example, when copper is used as a material of the metal fine line and an oxide coating is formed on its surface by oxidation treatment, the surface of the metal fine line can be treated in black with antireflection property without reducing cross-sectional dimension of the metal fine line.

Also, when the metal fine line is, for example, black-chromeplated as a plating process, the surface of the metal fine line can be treated in black with antireflection property. Further, when plating with copper of high current density, it can be treated in brown.

It is also possible to use electrodeposition coating treatment as the low-reflection treatment.

Incidentally, when the conductive fine line in the first electrode pattern 25a is formed narrower in line width than the conductive fine line in the second electrode pattern 25b, resistance increases for the narrowed line width. Therefore, in the case where the outer shape of the electrode sheet 1 is rectangular, it is preferred that the extending direction of the first electrode pattern 25a of the narrow-designed line width is aligned with the short side, since resistance difference with the second electrode pattern 25b is reduced.

In the electrode sheets of the first to fourth embodiments, either the one principal surface 12a of the substrate 12, in which the first electrode pattern 25a is formed, or the other principal surface 12b of the substrate 12, in which the second electrode pattern 12b is formed, is not specified to be a touch surface side in assembling the touch panel. Thus, the terms "first" and "second" may be replaced each other in the present specification.

REFERENCE SIGNS LIST 1, 10, 100 an electrode sheet
12 a substrate
14a a first conductive part
14b a second conductive part
16, 18 a conductive fine line
16a, 18a a facing line segment
17 a blank part
20, 21 a gap
24a a first sensor part
24b a second sensor part
25a a first electrode pattern
25b a second electrode pattern
34a a first terminal wiring part
34b a second terminal wiring part
35a a first terminal wiring pattern
35b a second terminal wiring pattern
40 a linear projection
55a a first dummy pattern
55b a second dummy pattern
110, 120 a laminated raw material
111a a first light
111b a second light
113a a first photosensitive layer
113b a second photosensitive layer
115a a first conductive layer
115b a second conductive layer
117a a first photomask
117b a second photomask
118a a first light source
118b a second light source
123a a first conductive photosensitive layer
123b a second conductive photosensitive layer

The invention claimed is:

1. An electrode sheet for a capacitance-type touch panel comprising:
a transparent substrate;
a first conductive part provided on one principal surface of the substrate; and
a second conductive part provided on the other principal surface of the substrate, wherein
the first conductive part has a plurality of first electrode patterns that
(i) are comprised of:
conductive fine lines, each line of the conductive fine lines of the plurality of first electrode patterns being opaque; and
blank parts partitioned by the conductive fine lines of the plurality of first electrode patterns,
(ii) extend in a first direction, and
(iii) are arranged in a second direction perpendicular to the first direction,
the second conductive part has a plurality of second electrode patterns that
(iv) are comprised of:
conductive fine lines, each line of the conductive fine lines of the plurality of second electrode patterns being opaque; and
blank parts partitioned by the conductive fine lines of the plurality of second electrode patterns,
(v) extend in the second direction, and
(vi) are arranged in the first direction,
each of the plurality of first electrode patterns and the plurality of second electrode patterns have respective line segments of the conductive fine lines of the plurality of first electrode patterns and the conductive fine lines of the plurality of second electrode patterns that face each other across the transparent substrate, and
the conductive fine lines in one of the plurality of first electrode patterns and the plurality of second electrode patterns are formed narrower in line width than the conductive fine lines in the other of the plurality of first electrode patterns and the plurality of second electrode patterns only at the respective facing line segments extending in the same direction, thereby formed to have a non-uniform width.

2. The electrode sheet for a capacitance-type touch panel according to claim 1, wherein a narrowed ratio in the respective facing line segments extending in the same direction is in the range of 30% to 90%.

3. The electrode sheet for a capacitance-type touch panel according to claim 1, further comprising a projected mesh pattern at a part where optical transparency is required, wherein combination of the first conductive part and the second conductive part defines the projected mesh pattern.

4. The electrode sheet for a capacitance-type touch panel according to claim 3, wherein a line width of the projected mesh pattern is 15 µm or less and an aperture ratio is 85% or more.

5. The electrode sheet for a capacitance-type touch panel according to claim 1, wherein at least one of the plurality of first electrode patterns and the plurality of second electrode patterns is formed in a shape having a mesh structure.

6. The electrode sheet for a capacitance-type touch panel according to claim 1, wherein neither of the plurality of first electrode patterns nor the plurality of second electrode patterns is formed in a shape having a mesh structure.

7. The electrode sheet for a capacitance-type touch panel according to claim 1, wherein one of the plurality of first electrode patterns and the plurality of second electrode patterns, of which the line width at the respective facing line segments is formed narrower, is made shorter than the other of the plurality of first electrode patterns and the plurality of second electrode patterns.

8. The electrode sheet for a capacitance-type touch panel according to claim 1, wherein the conductive fine lines of the plurality of first electrode patterns and the conductive fine lines of the plurality of second electrode patterns are metal fine lines made of a metal selected from the group consisting of gold, copper, silver, nickel, aluminum and molybdenum or an alloy.

9. The electrode sheet for a capacitance-type touch panel according to claim 8, wherein a touch side surface of the conductive fine lines of the plurality of first electrode patterns and the conductive fine lines of the plurality of second electrode patterns includes a low-reflection treatment.

10. The electrode sheet for a capacitance-type touch panel according to claim 1, wherein the conductive fine lines of the plurality of first electrode patterns and the conductive fine lines of the plurality of second electrode patterns are non-metal fine lines containing one or more materials selected from the group consisting of carbon, carbon nanotube and graphene.

11. The electrode sheet for a capacitance-type touch panel according to claim 1, wherein
the first conductive part further includes a plurality of first dummy patterns that are comprised of conductive fines lines made of a same material as the plurality of first electrode patterns, placed at a gap between adjacent first electrode patterns of the plurality of first electrode patterns, and insulated electrically from the plurality of first electrode patterns;
the second conductive part further includes a plurality of second dummy patterns that are comprised of conductive fine lines made of a same material as the plurality of second electrode patterns, placed at a gap between adjacent second electrode patterns of the plurality of second electrode patterns, and insulated electrically from the plurality of second electrode patterns; and
one of the plurality of first electrode patterns and the plurality of second electrode patterns, of which the line width at the respective facing line segments is formed narrower, is formed narrower at line segments which face the plurality first dummy patterns or the plurality of second dummy patterns.

\* \* \* \* \*